US006589129B2

(12) United States Patent
Usoro et al.

(10) Patent No.: US 6,589,129 B2
(45) Date of Patent: Jul. 8, 2003

(54) POWERTRAIN HAVING A MULTI-SPEED TRANSMISSION WITH THREE PLANETARY GEAR SETS

(75) Inventors: Patrick Benedict Usoro, Troy, MI (US); Chi-Kuan Kao, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 2 days.

(21) Appl. No.: 09/967,889

(22) Filed: Oct. 1, 2001

(65) Prior Publication Data

US 2003/0064852 A1 Apr. 3, 2003

(51) Int. Cl.$^7$ ................................. F16H 3/62
(52) U.S. Cl. .................. 475/275; 475/282; 475/284; 475/286
(58) Field of Search ................. 475/275, 276, 475/277, 278, 279, 282, 284, 286

(56) References Cited

U.S. PATENT DOCUMENTS

| 4,395,925 | A | * | 8/1983 | Gaus | 475/278 |
| 5,475,595 | A | * | 12/1995 | Asahara et al. | 475/120 |
| 5,879,264 | A |  | 3/1999 | Raghavan et al. | 475/280 |
| 5,997,429 | A |  | 12/1999 | Raghavan et al. | 475/280 |
| 6,053,839 | A | * | 4/2000 | Baldwin et al. | 475/281 |

FOREIGN PATENT DOCUMENTS

| WO | 00/57081 | 9/2000 |
| WO | 00/57082 | 9/2000 |

* cited by examiner

Primary Examiner—Sherry Estremsky
(74) Attorney, Agent, or Firm—Kathryn A. Marra (57) ABSTRACT

A family of multi-speed transmissions with each family member including three planetary gear sets having three members each. The first planetary gear set has a first member continuously interconnected with an input shaft. The third planetary gear set has a first member continuously interconnected with an output shaft. A second member of the first planetary gear set, a first member of the second planetary gear set and a second member of the third planetary gear set are continuously interconnected for common rotation. The first and third planetary gear sets each have one non-continuously interconnected member, and the second planetary gear set has two non-continuously interconnected members. Two stationary torque transmitting mechanisms are provided to each connect one of the non-continuously interconnected members with a stationary portion of the transmission. Three rotary torque transmitting mechanisms are provided to interconnect the nonconnected members with another nonconnected member or with the input or output connected members. Judicious selective engagement of the torque transmitting mechanisms, in combinations of three, provides six forward speed ratios and one reverse speed ratio.

4 Claims, 6 Drawing Sheets

Figure - 1

| | Ratios | 50 | 52 | 54 | 56 | 58 |
|---|---|---|---|---|---|---|
| Reverse | -2.09 | | X | X | | X |
| Neutral | 0 | | X | X | | |
| 1 | 4.03 | | X | X | X | |
| 2 | 2.47 | X | X | | X | |
| 3 | 1.66 | | X | | X | X |
| 4 | 1.21 | X | | | X | X |
| 5 | 1 | | | X | X | X |
| 6 | 0.76 | X | | X | | X |

(X=engaged clutch)

Ring Gear / Sun Gear Tooth Ratio:  $\frac{R_1}{S_1} = 1.59$,  $\frac{R_2}{S_2} = 1.93$,  $\frac{R_3}{S_3} = 3.03$

| Ratio Spread | 5.31 |
|---|---|
| Ratio Steps | |
| Rev/1 | -0.52 |
| 1/2 | 1.63 |
| 2/3 | 1.49 |
| 3/4 | 1.37 |
| 4/5 | 1.21 |
| 5/6 | 1.32 |

| | Ratios | 150 | 152 | 154 | 156 | 158 |
|---|---|---|---|---|---|---|
| Reverse | -3.58 | X | X | | | X |
| Neutral | 0 | X | X | | | |
| 1 | 7.14 | X | X | | X | |
| 2 | 4.06 | X | X | X | | |
| 3 | 2.83 | | X | X | X | |
| 4 | 1.76 | X | | | X | X |
| 5 | 1.28 | X | | X | | X |
| 6 | 1 | | | X | X | X |

(X=engaged clutch)

$\frac{\text{Ring Gear}}{\text{Sun Gear}}$ Tooth Ratio: $\frac{R_1}{S_1} = 2.50$, $\frac{R_2}{S_2} = 2.30$, $\frac{R_3}{S_3} = 1.83$

| Ratio Spread | 7.14 |
|---|---|
| Ratio Steps | |
| Rev/1 | -0.5 |
| 1/2 | 1.76 |
| 2/3 | 1.43 |
| 3/4 | 1.61 |
| 4/5 | 1.38 |
| 5/6 | 1.28 |

| | Ratios | 250 | 252 | 254 | 256 | 258 |
|---|---|---|---|---|---|---|
| Reverse | -2.98 | | X | X | X | |
| Neutral | 0 | | | X | X | |
| 1 | 3.3 | X | | X | X | |
| 2 | 1.62 | X | X | | X | |
| 3 | 1 | | X | | X | X |
| 4 | 0.73 | X | X | | | X |
| 5 | 0.6 | X | | | | X |
| 6 | 0.44 | | X | | | X |

(X=engaged clutch)

Ring Gear / Sun Gear Tooth Ratio: $\frac{R_1}{S_1} = 1.73$, $\frac{R_2}{S_2} = 2.21$, $\frac{R_3}{S_3} = 2.73$

| Ratio Spread | 7.53 |
|---|---|
| Ratio Steps | |
| Rev/1 | -0.9 |
| 1/2 | 2.04 |
| 2/3 | 1.62 |
| 3/4 | 1.37 |
| 4/5 | 1.22 |
| 5/6 | 1.37 |

| | Ratios | 350 | 352 | 354 | 356 | 358 |
|---|---|---|---|---|---|---|
| Reverse | -2.96 | | X | X | X | |
| Neutral | 0 | | | X | X | |
| 1 | 3.29 | X | | X | X | |
| 2 | 1.61 | X | X | X | | |
| 3 | 1 | X | | X | | X |
| 4 | 0.73 | X | X | | | X |
| 5 | 0.6 | X | | | X | X |
| 6 | 0.44 | | X | | X | X |

(X=engaged clutch)

$\frac{\text{Ring Gear}}{\text{Sun Gear}}$ Tooth Ratio: $\frac{R_1}{S_1} = 2.20$, $\frac{R_2}{S_2} = 2.73$, $\frac{R_3}{S_3} = 1.58$

| Ratio Spread | 7.53 |
|---|---|
| Ratio Steps | |
| Rev/1 | -0.9 |
| 1/2 | 2.04 |
| 2/3 | 1.61 |
| 3/4 | 1.37 |
| 4/5 | 1.22 |
| 5/6 | 1.37 |

| | Ratios | 450 | 452 | 454 | 456 | 458 |
|---|---|---|---|---|---|---|
| Reverse | -3.19 | | X | X | | X |
| Neutral | 0 | | X | | | X |
| 1 | 3.78 | X | X | | | X |
| 2 | 2.54 | | X | | X | X |
| 3 | 1.37 | X | | | X | X |
| 4 | 1 | | | X | X | X |
| 5 | 0.78 | X | | X | X | |
| 6 | 0.61 | | X | X | X | |

(X=engaged clutch)

$\frac{\text{Ring Gear}}{\text{Sun Gear}}$ Tooth Ratio: $\frac{R_1}{S_1}=1.59$, $\frac{R_2}{S_2}=1.52$, $\frac{R_3}{S_3}=1.81$

| Ratio Spread | 6.18 |
|---|---|
| Ratio Steps | |
| Rev/1 | -0.85 |
| 1/2 | 1.49 |
| 2/3 | 1.86 |
| 3/4 | 1.37 |
| 4/5 | 1.28 |
| 5/6 | 1.28 |

| | Ratios | 550 | 552 | 554 | 556 | 558 |
|---|---|---|---|---|---|---|
| Reverse | -3.19 | | X | X | X | |
| Neutral | 0 | | X | | X | |
| 1 | 3.78 | X | X | | X | |
| 2 | 2.55 | | X | | X | X |
| 3 | 1.37 | X | | | X | X |
| 4 | 1 | | | X | X | X |
| 5 | 0.78 | X | | X | | X |
| 6 | 0.61 | | X | X | | X |

(X=engaged clutch)

$\frac{Ring\ Gear}{Sun\ Gear}$ Tooth Ratio: $\frac{R_1}{S_1}=1.81$, $\frac{R_2}{S_2}=1.63$, $\frac{R_3}{S_3}=1.93$

| Ratio Spread | 6.17 |
|---|---|
| Ratio Steps | |
| Rev/1 | -0.84 |
| 1/2 | 1.48 |
| 2/3 | 1.86 |
| 3/4 | 1.37 |
| 4/5 | 1.28 |
| 5/6 | 1.27 |

Figure - 12

POWERTRAIN HAVING A MULTI-SPEED TRANSMISSION WITH THREE PLANETARY GEAR SETS

TECHNICAL FIELD

This invention relates to multi-speed transmissions having three planetary gear sets and five torque transmitting mechanisms and more particularly to a family of such transmissions wherein six forward speed ratios and one reverse speed ratio are provided.

BACKGROUND OF THE INVENTION

Passenger vehicles include a powertrain that is comprised of an engine, multi-speed transmission and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft) transmissions were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration. It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978, U.S. Pat. No. 6,071,208 issued to Koivunen on Jun. 6, 2000, and U.S. Pat. No. 5,106,352 issued to Lepelletier on Apr. 21, 1992.

Six speed transmissions offer several advantages over four and five speed transmissions, including improved vehicle acceleration and improved fuel economy. While many trucks employ power transmissions, such as Polak, having six or more forward gear ratios, passenger cars are still manufactured with three and four speed automatic transmissions and relatively few five or six speed devices due to the size and complexity of these transmissions. The Polak transmission provides six forward speed ratios with three planetary gear sets, two clutches and three brakes. The Koivunen patent utilizes six torque transmitting devices including four brakes and two clutches to establish the six forward speed ratios and another reverse speed ratio. The Lepelletier employs three planetary gear sets, three clutches and two brakes to provide six forward speeds. One of the planetary gear sets is positioned and operated to establish two fixed speed input members for the remaining planetary gear sets.

SUMMARY OF THE INVENTION

It is an object of the present invention to provide an improved family of transmissions having three planetary gear sets that are selectively controlled to provide six forward speed ratios and one reverse speed ratio.

In one aspect of the invention, each planetary gear set has three members including a sun gear member, a ring gear member, and a planet carrier member. In another aspect of the present invention, each of the planetary gear sets may be of the simple or compound type. In yet another aspect of the present invention, an input shaft is continuously connected with one member of one of the planetary gear sets and an output shaft is continuously connected with one member of another of the planetary gear sets. In still another aspect of the present invention, a member of each planetary, not otherwise continuously connected, are interconnected by an interconnecting member. In yet still another aspect of the present invention, five torque transmitting mechanisms are incorporated in each family member and consist of two stationary-type torque transmitting mechanisms and three rotating-type torque transmitting mechanisms.

In a further aspect of the present invention, the stationary-type torque transmitting mechanisms are selectively connectable between otherwise non-continuously connected members of the planetary gear sets and a stationary housing of the transmission. In a yet further aspect of the present invention, at least one of the rotating torque transmitting mechanisms is selectively connectable between otherwise non-continuously connected members of the planetary gear sets. In a still further aspect of the present invention, the torque transmitting mechanisms are engaged in combinations of three to provide six forward speed ratios and one reverse ratio.

The family of transmissions defined by the present invention provides a plurality of low-content, low-cost, six speed mechanisms that require only three planetary gear sets and five selectively engageable torque transmitting mechanisms. These mechanisms offer several advantages over four and five speed counterparts including improved vehicle acceleration performance and improved fuel economy. Each of the planetary gear sets includes three members. A first member of the first and third planetary gear sets are connected with a transmission input shaft and a transmission output shaft, respectively. A second member of the first and third planetary gear sets and a first member of the second planetary gear sets are continuously interconnected by an interconnecting member that may be comprised of a plurality of components. A first of the torque transmitting mechanisms selectively connects a member of the first or second planetary gear sets with a stationary component of the transmission. A second of the torque transmitting mechanisms selectively connects another member of the second planetary gear set or a member of the third planetary gear set with the stationary component. A third of the torque transmitting mechanisms selectively interconnects a member of the first planetary gear set with a member of the second or third planetary gear set. A fourth of the torque transmitting mechanisms selectively interconnects a member of the second planetary gear set with a member of the first or third planetary gear set. A fifth of the torque transmitting mechanisms selectively interconnects a member of the first or second or third planetary gear set with another member of the first planetary gear set, the second planetary gear set, the third planetary gear set, the input shaft, or the output shaft. As previously mentioned, the five torque transmitting mechanisms are selectively engaged in combinations of three to establish six forward speed ratios and a reverse ratio between the input shaft and the output shaft. A variety of numerical speed ratios and ratio spreads can be realized by the judicious selection of the ring gear/sun gear tooth ratios of the planetary gear sets.

DESCRIPTION OF AN EXEMPLARY EMBODIMENT

Figure 1:
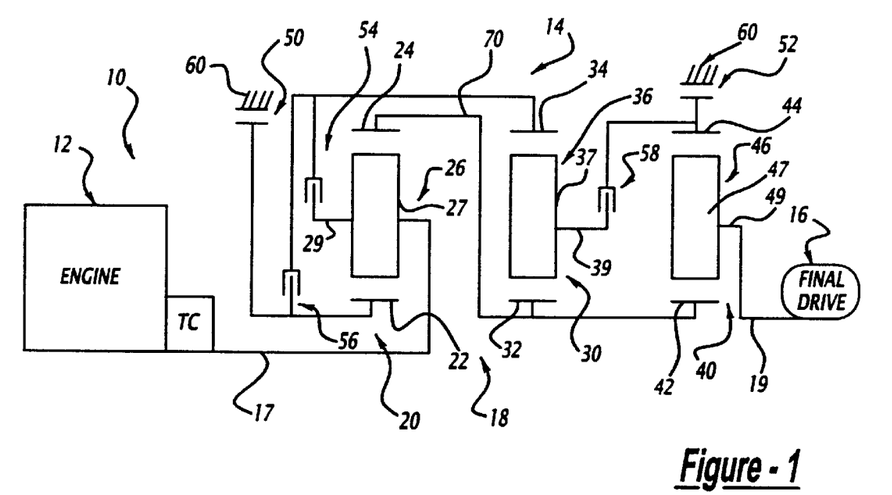
FIG. 1 is schematic representation of a powertrain incorporating one embodiment of the present invention.

A powertrain 10, shown in FIG. 1, includes a conventional engine and launch device 12, a multi-speed transmission 14, and a conventional final drive 16. The launch device may be a torque converter or starting clutch, for example. The transmission 14 incorporates an input shaft 17, a planetary gear arrangement 18, and an output shaft 19. The input shaft 17 is continuously connected with the engine and starting device 12 and the output shaft 19 is continuously connected with the final drive mechanism 16. The planetary gear arrangement 18 has three planetary gear sets 20, 30, and 40 and five torque transmitting mechanisms 50, 52, 54, 56, and 58. The torque transmitting mechanisms 50 and 52 are conventional fluid-operated selectively engageable stationary torque transmitting mechanisms or brakes that are connected with a stationary transmission portion or housing 60; and the torque transmitting mechanisms 54, 56, and 58 are conventional fluid-operated selectively engageable rotating torque transmitting mechanisms or clutches. For the following specification and claims, these devices will be referred to as torque transmitting mechanisms. The torque transmitting mechanisms are preferably controlled by a conventional electro-hydraulic control mechanism, not shown, that includes at least a programmable digital computer, a hydraulic pressure source and control valves.

The planetary gear set 20 has a sun gear member 22, a ring gear member 24, and a planet carrier assembly member 26 that includes a plurality of planet pinion gear members 27 rotatably mounted on a carrier 29 and disposed in meshing relation with both of the sun gear member 22 and the ring gear member 24. The planetary gear set 30 has a sun gear member 32, a ring gear member 34, and a planet carrier assembly member 36 that includes a plurality of planet pinion gear members 37 rotatably mounted on a carrier 39 and disposed in meshing relation with both of the sun gear member 32 and the ring gear member 34. The planetary gear set 40 has a sun gear member 42, a ring gear member 44, and a planet carrier assembly member 46 that includes a plurality of planet pinion gear members 47 rotatably mounted on a carrier 49 and disposed in meshing relation with both of the sun gear member 42 and the ring gear member 44.

Figure 2:
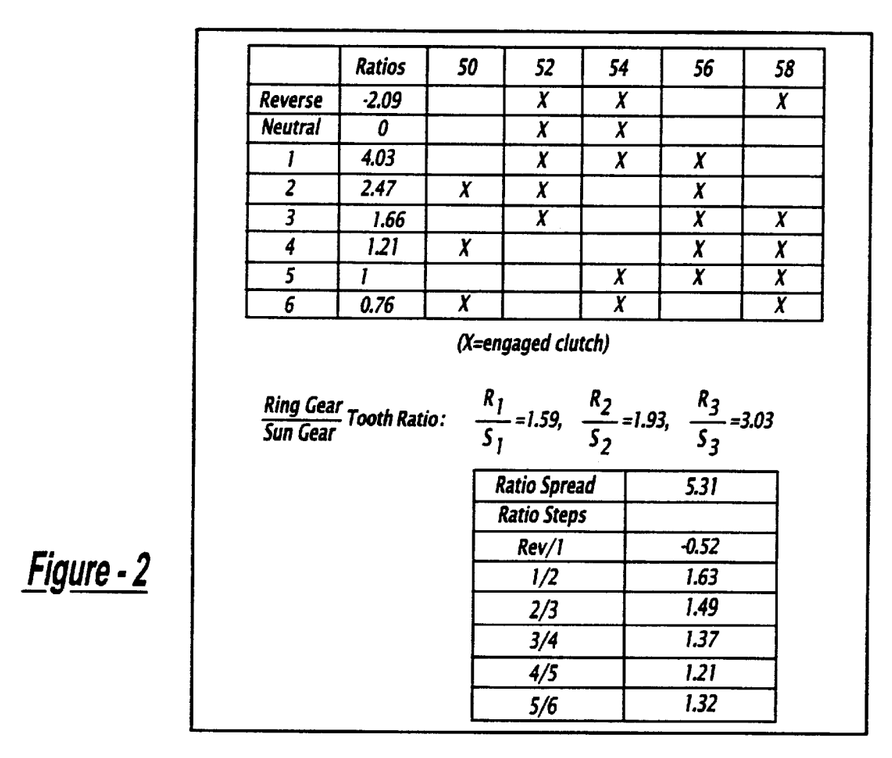
FIG. 2 is a truth table and chart describing some of the operating characteristics of the powertrain depicted in FIG. 1.

The planet carrier assembly member 26 is continuously interconnected with the input shaft 17 and the planet carrier assembly member 46 is continuously interconnected with the output shaft 19. The ring gear member 24, the sun gear member 32, and the sun gear member 42 are continuously interconnected through an interconnecting member 70. The sun gear member 22 is selectively interconnectable connectable with the housing 60 through the torque transmitting mechanism 50 and selectively interconnectable with the ring gear member 34 through the torque transmitting mechanism 56. The planet carrier assembly member 26 and the input shaft 17 are selectively interconnectable with the ring gear member 34 through the torque transmitting mechanism 54. The planet carrier assembly member 36 and the ring gear member 44 are selectively interconnectable through the torque transmitting mechanism 58. The ring gear member 44 is selectively interconnectable with the housing 60 through the torque transmitting mechanism 52. When the torque transmitting mechanisms 56 and 50 are simultaneously engaged, the sun gear member 22 and the ring gear member 34 will be stationary. When the torque transmitting mechanisms 58 and 52 are simultaneously engaged, the planet carrier assembly member 36 and the ring gear member 44 will be stationary. The judicious engagement of the torque transmitting mechanisms 50, 52, 54, 56, and 58 in combinations of three, as shown in FIG. 2, will provide six forward speed ratios and a reverse ratio through the planetary gear arrangement between the input shaft 17 and the output shaft 19. A neutral condition is also attainable.

The reverse speed ratio is established with the engagement of the torque transmitting mechanisms 52, 54 and 58. The planet carrier assembly member 36 and the ring gear member 44 are stationary and the ring gear member 34 is rotating in unison with the input shaft 17 and the planet carrier assembly member 26. The sun gear member 32 and the sun gear member 42 are rotated in reverse (opposite to input shaft rotation) at a speed determined by the speed of the ring gear member 34 and the ring gear/sun gear tooth ratio of the planetary gear set 30. The planet carrier assembly member 46 and the output shaft 19 are rotated in reverse at a reduce speed determined by the speed of the sun gear member 42 and the ring gear/sun gear tooth ratio of the planetary gear set 40. The overall numerical ratio of the reverse speed ratio is determined by the ring gear/sun gear tooth ratios of the planetary gear sets 30 and 40.

A neutral condition is established from the reverse speed ratio by the disengagement of the torque transmitting mechanism 58. From this neutral condition, a first forward speed ratio is established with the engagement of the torque transmitting mechanism 56. With the torque transmitting mechanisms 52, 54 and 56 engaged, the ring gear member 44 is held stationary, the planetary gear set 20 and the planetary gear set 30 and the sun gear member 42 rotate in unison with the input shaft 17. The planet carrier assembly member 46 and the output shaft 19 are driven forwardly at a reduced speed determined by the speed of the sun gear member 42 and the ring gear/sun gear tooth ratio of the planetary gear set 40. The overall numerical value of the first forward speed ratio is determined by the ring gear/sun gear tooth ratio of the planetary gear set 40. It should be noted that a reverse/first interchange can be accomplished with the swapping of only the torque transmitting mechanisms 58 and 56, thus simplifying the control function during this interchange.

The second forward speed ratio is established with the engagement of the torque transmitting mechanisms 50, 52 and 56. A one/two ratio interchange is accomplished with the swapping of the torque transmitting mechanisms 50 and 54. This is a single transition interchange. During the second forward speed ratio, the ring gear member 44 is held stationary through the torque transmitting mechanism 52, and the sun gear member 22 and the ring gear member 34 are also held stationary through the torque transmitting mechanisms 50 and 56. The ring gear member 24, the sun gear member 32, and the sun gear member 42 are driven forwardly at an increased speed determined by the speed of the planet carrier assembly member 26 and the ring gear/sun gear tooth ratio of the planetary gear set 20. The planet carrier assembly member 46 and the output shaft 19 are driven forwardly at a reduced speed determined by the speed of the sun gear member 42 and the ring gear/sun gear tooth ratio of the planetary gear set 40. The underdrive ratio of the planetary gear set 40 is considerably greater that the overdrive ratio of the planetary gear set 20 such that an overall underdrive ratio is provided during the second forward speed ratio, the numerical value of which is determined by the ring gear/sun gear tooth ratios of the planetary gear sets 20 and 40.

The third forward speed ratio is established with the engagement of the torque transmitting mechanisms 52, 56 and 58. The two/three interchange is a single transition interchange accomplished with the swapping of the torque transmitting mechanisms 50 and 58. The ring gear member 44 and the planet carrier assembly member 36 are held stationary through the cooperation of the torque transmitting mechanisms 52 and 58. Forward rotation of the planet carrier assembly member 26 results in forward rotation of the ring gear member 24 and the sun gear members 32 and 42, and reverse rotation of the sun gear member 22 and the ring gear member 34 at speeds determined by the speed of the planet carrier assembly member 26 and the ring gear/sun gear tooth ratios of the planetary gear sets 20 and 30. The planet carrier assembly member 46 and the output shaft 19 are driven forwardly at a reduced speed determined by the speed of the sun gear member 42 and the ring gear/sun gear tooth ratio of the planetary gear set 40. The numerical value of the third forward speed ratio is determined by the ring gear/sun gear tooth ratios of the planetary gear sets 20, 30 and 40.

The fourth forward speed ratio is established with the engagement of the torque transmitting mechanisms 50, 56 and 58. The three/four interchange is a single transition interchange accomplished by the swapping of the torque transmitting mechanisms 50 and 52. The sun gear member 22 and the ring gear member 34 are held stationary through the cooperation of the torque transmitting mechanisms 50 and 56. The planet carrier assembly member 36 and the ring gear member 44 are interconnected by the torque transmitting mechanism 58. The ring gear member 24 and the sun gear members 32 and 42 are driven forwardly at an increased speed determined by the speed of the planet carrier assembly member 26 and the ring gear/sun gear tooth ratio of the planetary gear set 20. The planet carrier assembly member 36 and the ring gear member 44 are driven forwardly at a reduced speed determined by the speed of the sun gear member 32 and the ring gear/sun gear tooth ratio of the planetary gear set 30. The planet carrier assembly member 46 and the output shaft 19 are driven forwardly at a reduced speed determined by the speed of the sun gear member 42, the speed of the ring gear member 44 and the ring gear/sun gear tooth ratio of the planetary gear set 40. The numerical value of the fourth forward speed ratio is determined by the ring gear/sun gear tooth ratios of the planetary gear sets 20, 30 and 40.

The fifth forward speed ratio is established with the engagement of the torque transmitting mechanisms 54, 56 and 58. The four/five speed ratio interchange is a single transition interchange accomplished by the swapping of the torque transmitting mechanisms 50 and 54. The engagement of the three rotating torque transmitting mechanisms causes the input shaft 17, the planetary gear sets 20, 30 and 40, and the output shaft 19 to rotate in unison. The fifth forward speed ratio is a one-to-one ratio.

The sixth forward speed ratio is established with the engagement of the torque transmitting mechanisms 50, 54 and 58. The five/six interchange is a single transition interchange that is accomplished with the swapping of the torque transmitting mechanisms 56 and 50. During the sixth forward speed ratio, the sun gear member 22 is held stationary by the torque transmitting mechanism 50, the ring gear member 34 is rotated in unison with the input shaft 17 and the planet carrier assembly member 26, and the planet carrier assembly member 36 and the ring gear member 44 rotate in unison. The ring gear member 34 and sun gear members 32 and 42 are rotated forwardly at an increased speed determined by the speed of the planet carrier assembly member 26 and the ring gear/sun gear tooth ratio of the planetary gear set 20. The planet carrier assembly member 36 and the ring gear member 44 are rotated forwardly at an increased speed determined by the speed of the sun gear member 32, the speed of the ring gear member 34, and the ring gear/sun gear tooth ratio of the planetary gear set 30. The planet carrier assembly member 46 and the output shaft 19 are driven forwardly at an increased speed determined by the speed of the sun gear member 42, the speed of the ring gear member 44 and the ring gear/sun gear tooth ratio of the planetary gear set 40. The numerical value of the sixth forward speed ratio is determined by the ring gear/sun gear tooth ratios of the planetary gear sets 20, 30 and 40.

The charts in FIG. 2 describe the engagement schedule of the torque transmitting mechanisms 50, 52, 54, 56, and 58 during the establishment of the reverse speed ratio and the six forward speed ratios. FIG. 2 also provides an example of possible ring gear/sun gear tooth ratios for the planetary gear sets 20, 30 and 40 as well as speed ratio values that are attained with these ring gear/sun gear tooth ratios. FIG. 2 further provides the step ratios between adjacent speed ratios, the overall ratio spread of the forward speed ratios, and the reverse/first ratio step. As pointed out above, the single step interchanges are all of the single transition type.

Figure 3:
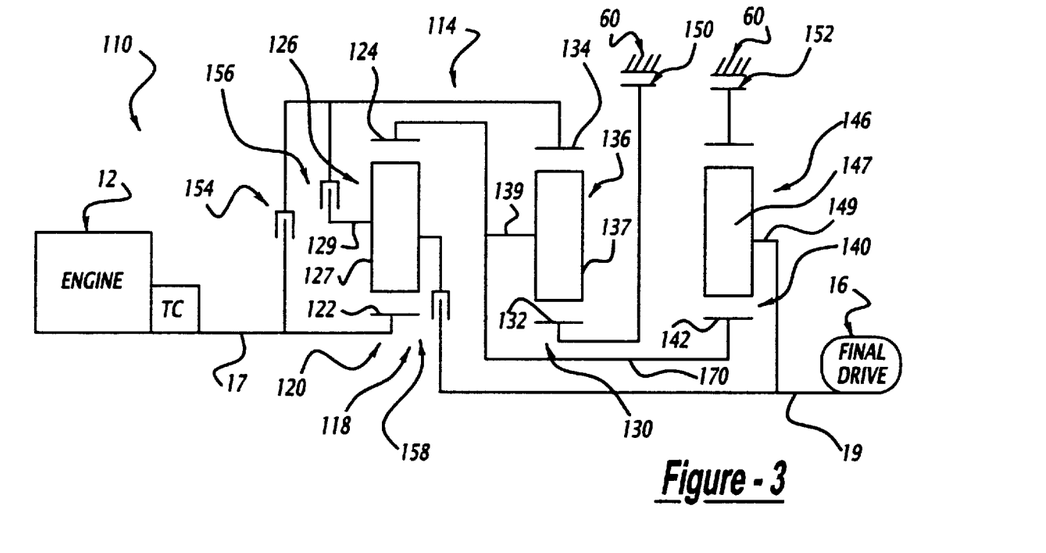
FIG. 3 is schematic representation of a powertrain incorporating another embodiment of the present invention.

A powertrain 110, described in FIG. 3, includes the engine and starting device 12, a multi-speed transmission 114, and the final drive mechanism 16. The multi-speed transmission 114 is comprised of the input shaft 17, a planetary gear arrangement 118, and an output shaft 19. The input shaft 17 is continuously connected with the engine and starting device 12 and the output shaft 19 is continuously connected with the final drive mechanism 16.

The planetary gear arrangement incorporates three planetary gear sets 120, 130 and 140 and five torque transmitting mechanisms 150, 152, 154, 156, and 158. The planetary gear set 120 includes a sun gear member 122, a ring gear member 124, and a planet carrier assembly member 126 that has a plurality of pinion gear members 127 rotatably mounted on a carrier 129 and disposed in meshing engagement with both the sun gear member 122 and the ring gear member 124. The planetary gear set 130 includes a sun gear member 132, a ring gear member 134, and a planet carrier assembly member 136 having a plurality of pinion gear members 137 that are rotatably mounted on a carrier 139 and disposed in meshing relation with both the sun gear member 132 and the ring gear member 134. The planetary gear set 140 includes a sun gear member 142, a ring gear member 144, and a planet carrier assembly member 146 that includes a plurality of pinion gear members 147 that are rotatably mounted on a carrier 149 and disposed in meshing relation with both the sun gear member 142 and the ring gear member 144.

The sun gear member 122 is continuously interconnected with the input shaft 17 and the planet carrier assembly member 146 is continuously interconnected with the output shaft 19. The ring gear member 124, the planet carrier assembly member 136 and the sun gear member 142 are continuously interconnected by an interconnecting member 170. The sun gear member 132 is selectively interconnectable with the housing 60 through the torque transmitting mechanism 150 and the ring gear member 144 is selectively interconnectable with the housing 60 through the torque transmitting mechanism 152. The input shaft 17 and the sun gear member 122 are selectively interconnectable with the ring gear member 134 through the torque transmitting mechanism 154. The planet carrier assembly member 126 is selectively interconnectable with the ring gear member 134 through the torque transmitting mechanism 156 and selectively interconnectable with the planet carrier assembly member 146 and the output shaft 19 through the torque transmitting mechanism 158. The truth table in FIG. 4 describes the engagement schedule of the torque transmitting mechanisms 150, 152, 154, 156, and 158, in combinations of three, which result in a reverse speed ratio and six forward speed ratios.

The reverse speed ratio is established with the engagement of the torque transmitting mechanisms 150, 152 and 158. The sun gear member 132 is held stationary by the torque transmitting mechanism 150. The ring gear member 144 is held stationary by the torque transmitting mechanism 152. The planet carrier assembly member 126 is selectively interconnected with the planet carrier assembly member 146 and the output shaft 19. The ring gear member 124 and the sun gear member 142 are driven in reverse at a speed determined by the speed of the sun gear member 122, the speed of the planet carrier assembly member 126 (rotating reaction member), and the ring gear/sun gear tooth ratio of the planetary gear set 120. The planet carrier assembly members 146 and 126 and the output shaft 19 are driven in reverse at a reduced speed determined by the speed of the sun gear member 142 and the ring gear/sun gear tooth ratio of the planetary gear set 140. The numerical value of the reverse speed ratio is determined by the ring gear/sun gear tooth ratios of the planetary gear sets 120 and 140. A neutral condition can be achieved by releasing the torque transmitting mechanism 158.

The first forward speed ratio is established with the engagement of the torque transmitting mechanisms 150, 152 and 156. The torque transmitting mechanism 156 selectively interconnects the planet carrier assembly member 126 and the ring gear member 134. A reverse to forward interchange can be accomplished with the interchange of the torque transmitting mechanisms 158 and 156 while the torque transmitting mechanisms 150 and 152 remain engaged. The planet carrier assembly member 126 is rotated forwardly at a speed determined by the speed of the sun gear member 122, the speed of the ring gear member 124 (rotating reaction member), and the ring gear/sun gear tooth ratio of the planetary gear set 120. The planet carrier assembly member 136, the ring gear member 124, and the sun gear member 142 are driven forwardly at a speed determined by the speed of the ring gear member 134 and the ring gear/sun gear tooth ratio of the planetary gear set 130. The planet carrier assembly member 146 and the output shaft 19 are driven forwardly at a reduced speed determined by the speed of the sun gear member 142 and the ring gear/sun gear tooth ratio of the planetary gear set 140. The numerical value of the first forward speed ratio is determined by the ring gear/sun gear tooth ratios of the planetary gear sets 120, 130 and 140.

The second forward speed ratio is established through the engagement of the torque transmitting mechanisms 150, 152 and 154. The one/two interchange is a single transition interchange provided by the swapping of the torque transmitting mechanisms 156 and 154. The torque transmitting mechanism 154 selectively interconnects the sun gear member 122 and the input shaft 17 with the ring gear member 134. The planet carrier assembly member 136 and the sun gear member 142 are driven forwardly at a speed determined by the speed of the ring gear member 134 (input speed) and the ring gear/sun gear tooth ratio of the planetary gear set 130. The planet carrier assembly member 146 and the output shaft 19 are driven forwardly at a reduced speed determined by the speed of the sun gear member 142 and the ring gear/sun gear tooth ratio of the planetary gear set 140. The numerical value of the second forward speed ratio is determined by the ring gear/sun gear tooth ratios of the planetary gear sets 130 and 140.

The third forward speed ratio is established by the engagement of the torque transmitting mechanisms 152, 154 and 156. The two/three interchange is a single transition interchange provided by the swapping of the torque transmitting mechanisms 150 and 156. The planetary gear set 120 and the sun gear member 142 are rotated in unison with the input shaft 17. The planet carrier assembly member 146 and the output shaft 19 are rotated forwardly at a reduced speed determined by the speed of the sun gear member 142 (input speed) and the ring gear/sun gear tooth ratio of the planetary gear set 140. The numerical value of the third forward speed ratio is determined by the ring gear/sun gear tooth ratio of the planetary gear set 140.

The fourth forward speed ratio is established with the engagement of the torque transmitting mechanisms 150, 156 and 158. The planet carrier assembly member 126, the planet carrier assembly member 146 and the output shaft are rotated forwardly at a reduced speed determined by the speed of the sun gear member 122, the speed of the ring gear member 134 (rotating reaction), and the ring gear/sun gear tooth ratio of the planetary gear set 120. The planet carrier assembly member 136 and the ring gear member 124 are rotated forwardly at a speed determined by the speed of the ring gear member 134 and the ring gear/sun gear tooth ratio of the planetary gear set 130. The numerical value of the fourth speed ratio is determined by the ring gear/sun gear tooth ratios of the planetary gear sets 120 and 130.

The fifth forward speed ratio is established with the engagement of the torque transmitting mechanisms 150, 154 and 158. The four/five ratio interchange is a single transition interchange provided by the swapping of the torque transmitting mechanisms 156 and 154. The planet carrier assembly member 136 and the ring gear member 124 are driven forwardly at a speed determined by the speed of the ring gear member 134 (input speed) and the ring gear/sun gear tooth ratio of the planetary gear set 130. The planet carrier assembly member 126, the planet carrier assembly member 146, and the output shaft 19 are driven forwardly at a reduced speed determined by the speed of the sun gear member 122, the speed of the ring gear member 124, and the ring gear/sun gear tooth ratio of the planetary gear set 120. The numerical value of the fifth forward speed ratio is determined by the ring gear/sun gear tooth ratio of the planetary gear sets 120 and 130.

The sixth forward ratio is established by the engagement of the torque transmitting mechanisms 154, 156 and 158. The five/six ratio interchange is a single transition interchange provided by the swapping of the torque transmitting mechanisms 150 and 156. The planetary gear set 120 and the output shaft 19 rotate forwardly in unison with the input shaft 17. The sixth forward speed ratio is a one-to-one ratio.

Figure 4:
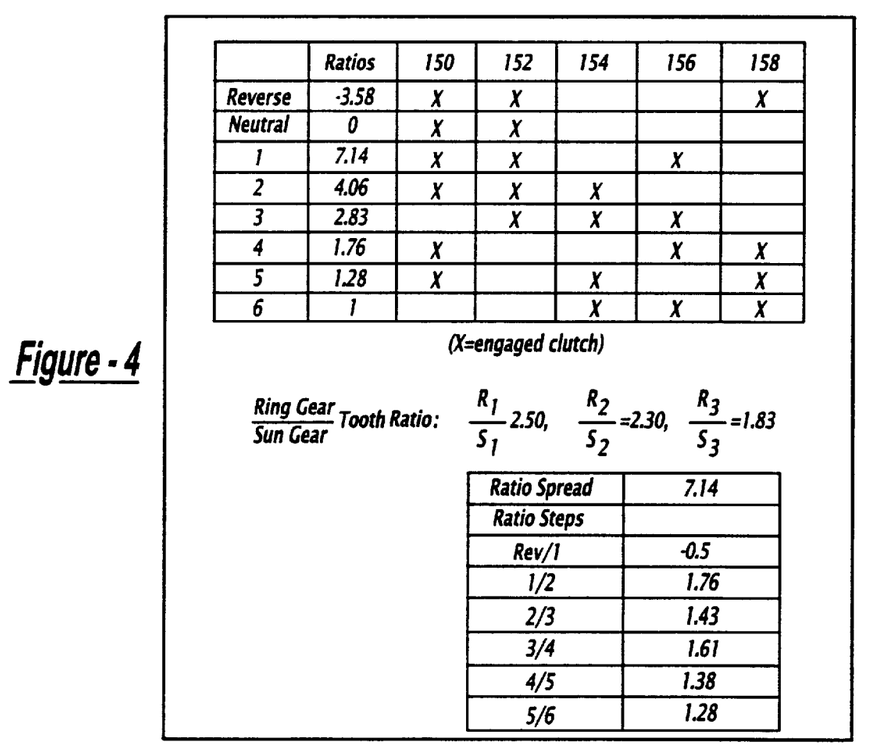
FIG. 4 is a truth table and chart describing some of the operating characteristics of the powertrain depicted in FIG. 3.

The charts in FIG. 4 describe the engagement schedule of the torque transmitting mechanisms 150, 152, 154, 156, and 158 during the establishment of the reverse speed ratio and the six forward speed ratios. FIG. 4 also provides an example of possible ring gear/sun gear tooth ratios for the planetary gear sets 120, 130 and 140 as well as speed ratio values that are attained with these ring gear/sun gear tooth ratios. FIG. 4 further provides the step ratios between adjacent speed ratios, the overall ratio spread of the forward speed ratios, and the reverse/first ratio step. As pointed out above, the single step interchanges are all of the single transition type.

Figure 5:
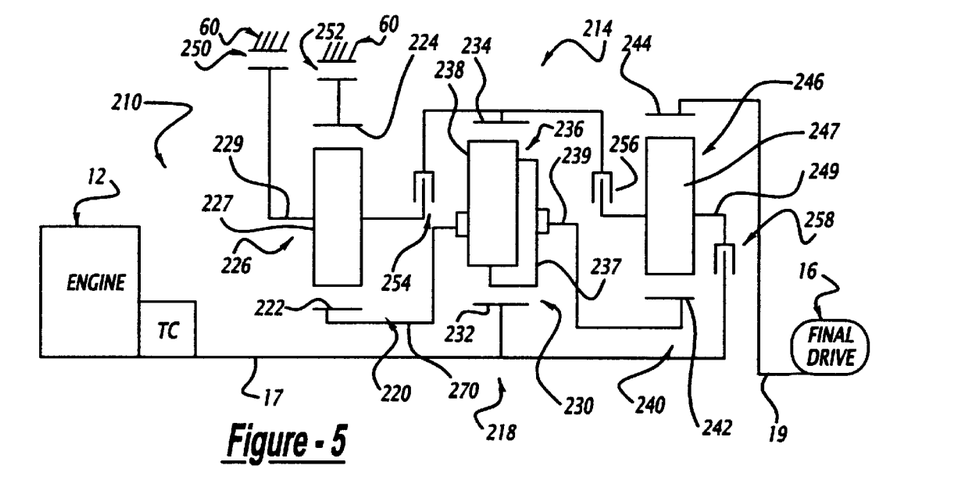
FIG. 5 is schematic representation of a powertrain incorporating another embodiment of the present invention.

A powertrain 210, described in FIG. 5, includes the engine and starting device 12, a multi-speed transmission 214, and the final drive mechanism 16. The multi-speed transmission 214 is comprised of the input shaft 17, a planetary gear arrangement 218, and an output shaft 19. The input shaft 17 is continuously connected with the engine and starting device 12 and the output shaft 19 is continuously connected with the final drive mechanism 16.

The planetary gear arrangement incorporates three planetary gear sets 220, 230 and 240 and five torque transmitting mechanisms 250, 252, 254, 256, and 258. The planetary gear set 220 includes a sun gear member 222, a ring gear member 224, and a planet carrier assembly member 226 that has a plurality of pinion gear members 227 rotatably mounted on a carrier 229 and disposed in meshing engagement with both the sun gear member 222 and the ring gear member 224. The planetary gear set 230 includes a sun gear member 232, a ring gear member 234, and a planet carrier assembly member 236 having a plurality of intermeshing pinion gear members 237 and 238 that are rotatably mounted on a carrier 239 and disposed in meshing relation with the sun gear member 232 and the ring gear member 234, respectively. The planetary gear set 240 includes a sun gear member 242, a ring gear member 244, and a planet carrier assembly member 246 that includes a plurality of pinion gear members 247 that are rotatably mounted on a carrier 249 and disposed in meshing relation with both the sun gear member 242 and the ring gear member 244.

The sun gear member 232 is continuously interconnected with the input shaft 17 and the ring gear member 244 is continuously interconnected with the output shaft 19. The sun gear member 222, the planet carrier assembly member 236 and the sun gear member 242 are continuously interconnected through an interconnecting member 270. The planet carrier assembly member 226 is selectively interconnectable with the housing 60 through the torque transmitting mechanism 250. The ring gear member 224 is selectively interconnectable with the housing 60 through the torque transmitting mechanism 252. The planet carrier assembly member 226 is selectively interconnectable with the ring gear member 234 through the torque transmitting mechanism 254. The ring gear member 234 is selectively interconnectable with the planet carrier assembly member 246 through the torque transmitting mechanism 256. The planet carrier assembly member 246 is selectively interconnectable with the sun gear member 232 and the input shaft 17 through the torque transmitting mechanism 258.

Figure 6:
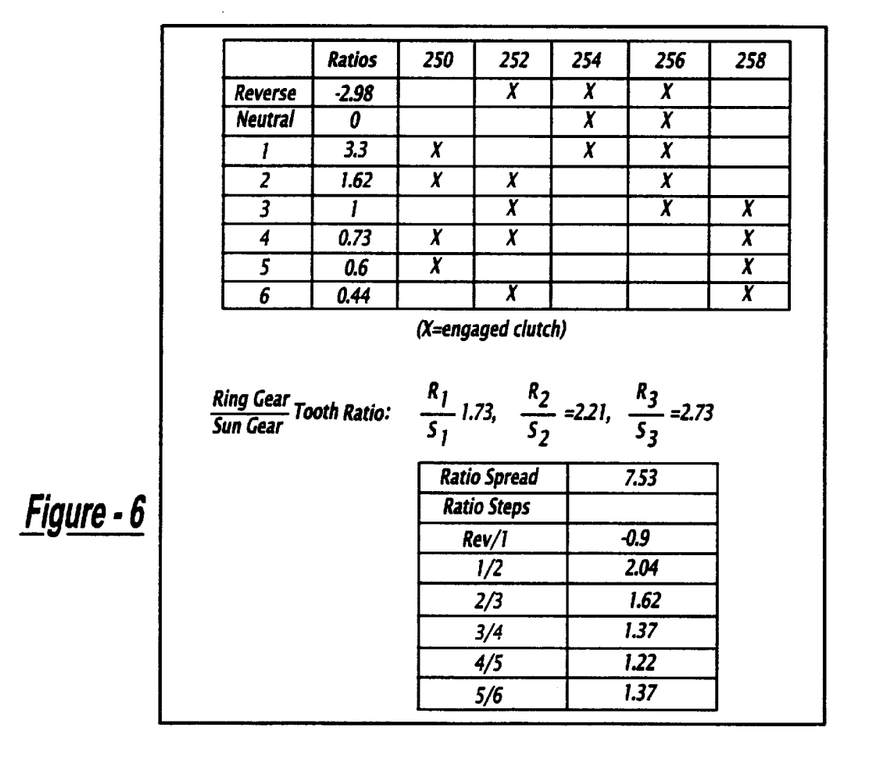
FIG. 6 is a truth table and chart describing some of the operating characteristics of the powertrain depicted in FIG. 5.

As can be determined from the truth table in FIG. 6, the torque transmitting mechanisms 250, 252, 254, 256, and 258 are selectively engaged in combinations of three to provide six forward speed ratios and a reverse speed ratio. The truth table also indicates that all of the single step forward ratio interchanges are of the single transition type. To establish the reverse speed ratio, the torque transmitting mechanisms 252, 254 and 256 are engaged. The ring gear member 224 is held stationary by the housing 60 through the torque transmitting mechanism 252 and the sun gear member 232 is driven forwardly by the input shaft 17. The planet carrier assembly member 236, the sun gear member 222, and the sun gear member 242 are rotated in reverse at a speed determined by the speed of the sun gear member 232, the speed of the ring gear member 234 (rotating reaction), and the ring gear/sun gear tooth ratio of the planetary gear set 230. The planet carrier assembly member 226, the ring gear member 234, and the planet carrier assembly member 246 are rotated in reverse at a speed determined by the speed of the sun gear member 222 and the ring gear/sun gear tooth ratio of the planetary gear set 220. The ring gear member 244 and the output shaft 19 are rotated in reverse at a reduced speed determined by the speed of the sun gear member 242, the speed of the planet carrier assembly member 246, and the ring gear/sun gear tooth ratio of the planetary gear set 240. The numerical value of the reverse speed ratio is determined by the ring gear/sun gear tooth ratios of the planetary gear sets 220, 230 and 240.

A neutral condition in established with the disengagement of the torque transmitting mechanism 252 while the torque transmitting mechanisms 254 and 256 remain engaged. The first forward speed ratio is established by the engagement of the torque transmitting mechanisms 250, 254 and 256. The planet carrier assembly member 226, the ring gear member 234 and the planet carrier assembly member 246 are held stationary by the cooperation of the torque transmitting mechanisms 250, 254 and 256, and the housing 60. The planet carrier assembly member 236 and the sun gear member 242 are rotated in reverse at a speed determined by the speed of the sun gear member 232 and the ring gear/sun gear tooth ratio of the planetary gear set 230. The ring gear member 244 and the output shaft 19 are driven forwardly at a reduced ratio determined by the speed of the sun gear member 242 and the ring gear/sun gear tooth ratio of the planetary gear set 240. The numerical value of the first forward speed ratio is determined by the ring gear/sun gear tooth ratios of the planetary gear sets 230 and 240.

The second forward speed ratio is established by the engagement of the torque transmitting mechanisms 250, 252 and 256. The planetary gear set 220, the planet carrier assembly member 236, and the sun gear member 242 are held stationary by the cooperation of the torque transmitting mechanisms 250 and 252 and the housing 60. The ring gear member 234 and the planet carrier assembly member 246 are rotated forwardly at a reduced speed determined by the speed of the sun gear member 232 and the ring gear/sun gear tooth ratio of the planetary gear set 230. The ring gear member 244 and the output shaft 19 are driven forwardly at a reduced speed determined by the speed of the planet carrier assembly member 246 and the ring,gear/sun gear tooth ratio of the planetary gear set 240. The numerical value of the second forward speed ratio is determined by the ring gear/sun gear tooth ratios of the planetary gear sets 230 and 240.

The third forward speed ratio is established by the engagement of the torque transmitting mechanisms 252, 256 and 258. The planetary gear sets 230 and 240 and the output shaft 19 rotate in unison with the input shaft 17. The third forward speed ratio is a one-to-one ratio.

The fourth forward speed ratio is established with the engagement of the torque transmitting mechanisms 250, 252 and 258. The planetary gear set 220, planet carrier assembly member 236, and sun gear member 244 are held stationary by the cooperation of the torque transmitting mechanisms 250 and 252 and the housing 60. The planet carrier assembly member 246 is rotated forwardly by the input shaft 17 and the ring gear member 244 and the output shaft 19 are driven forwardly at an increased speed determined by the speed of the planet carrier assembly member 246 and the ring gear/sun gear tooth ratio of the planetary gear set 240. The numerical value of the fourth forward speed ratio is determined by the ring gear/sun gear tooth ratio of the planetary gear set 240.

The fifth forward speed ratio is established with the engagement of the torque transmitting mechanisms 250, 254 and 258. The ring gear member 234 is held stationary through the cooperation of the torque transmitting mechanisms 250 and 254. The planet carrier assembly member 236 and the sun gear member 242 are driven in reverse at a reduced speed determined by the speed of the sun gear member 232 and the ring gear/sun gear tooth ratio of the planetary gear set 230. The ring gear member 244 and the output shaft 19 are driven forwardly at an increased speed determined by the speed of the planet carrier assembly member 246 (input speed), the speed of the sun gear member 242, and the ring gear/sun gear tooth ratio of the planetary gear set 240. The numerical value of the fifth forward speed ratio is determined by the planetary gear sets 230 and 240.

The sixth forward speed ratio is established with the engagement of the torque transmitting mechanisms 252, 254 and 258. The planet carrier assembly member 236, the sun gear member 222 and the sun gear member 242 are driven in reverse at a speed determined by the speed of the sun gear member 232, the speed of the ring gear member 234 and planet carrier assembly member 226, and the ring gear/sun gear tooth ratios of the planetary gear sets 220 and 230. The ring gear member 244 and the output shaft 19 are driven forwardly at a speed determined by the speed of the planet carrier assembly member 246, the speed of the sun gear member 242 and the ring gear/sun gear tooth ratio of the planetary gear set 240. The numerical value of the sixth forward speed ratio is determined by the planetary gear sets 220, 230 and 240.

The charts in FIG. 6 describe the engagement schedule of the torque transmitting mechanisms 250, 252, 254, 256, and 258 during the establishment of the reverse speed ratio and the six forward speed ratios. FIG. 6 also provides an example of possible ring gear/sun gear tooth ratios for the planetary gear sets 220, 230 and 240 as well as speed ratio values that are attained with these ring gear/sun gear tooth ratios. FIG. 6 further provides the step ratios between adjacent speed ratios, the overall ratio spread of the forward speed ratios, and the reverse/first ratio step. As pointed out above, the single step interchanges are all of the single transition type.

Figure 7:
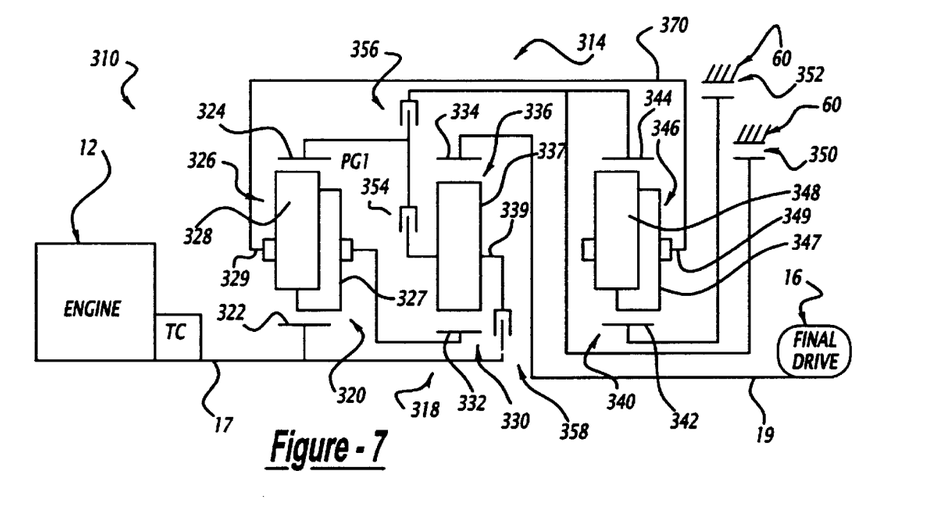
FIG. 7 is schematic representation of a powertrain incorporating another embodiment of the present invention.

A powertrain 310, shown in FIG. 7, includes the engine and starting device 12, a multi-speed transmission 314, and the final drive mechanism 16. The multi-speed transmission 314 is comprised of the input shaft 17, a planetary gear arrangement 318, and an output shaft 19. The input shaft 17 is continuously connected with the engine and starting device 12 and the output shaft 19 is continuously connected with the final drive mechanism 16.

The planetary gear arrangement incorporates three planetary gear sets 320, 330 and 340 and five torque transmitting mechanisms 350, 352, 354, 356, and 358. The planetary gear set 320 includes a sun gear member 322, a ring gear member 324, and a planet carrier assembly member 326 that has a plurality of intermeshing pinion gear members 327 and 328 rotatably mounted on a carrier 329 and disposed in meshing engagement with the sun gear member 322 and the ring gear member 324, respectively. The planetary gear set 330 includes a sun gear member 332, a ring gear member 334, and a planet carrier assembly member 336 having a plurality of pinion gear members 337 that are rotatably mounted on a carrier 339 and disposed in meshing relation with both of the sun gear member 332 and the ring gear member 334. The planetary gear set 340 includes a sun gear member 342, a ring gear member 344, and a planet carrier assembly member 346 that includes a plurality of intermeshing pinion gear members 347 and 348 that are rotatably mounted on a carrier 349 and disposed in meshing relation with the sun gear member 342 and the ring gear member 344, respectively.

The sun gear member 322 is continuously connected with the input shaft 17 and the ring gear member 334 is continuously connected with the output shaft 19. The planet carrier assembly member 326, the sun gear member 332 and the planet carrier assembly member 346 are continuously interconnected by an interconnecting member 370. The ring gear member 344 is selectively interconnectable with the housing 60 through the torque transmitting mechanism 350. The sun gear member 342 is selectively interconnectable with the housing 60 through the torque transmitting mechanism 352. The planet carrier assembly member 336 is selectively interconnectable with the sun gear member 322 and the input shaft 17 through the torque transmitting mechanism 358, and is selectively interconnectable with the ring gear member 324 through the torque transmitting mechanism 354. The ring gear member 324 is selectively interconnectable with the ring gear member 344 and the torque transmitting mechanism 350 through the torque transmitting mechanism 356.

Figure 8:
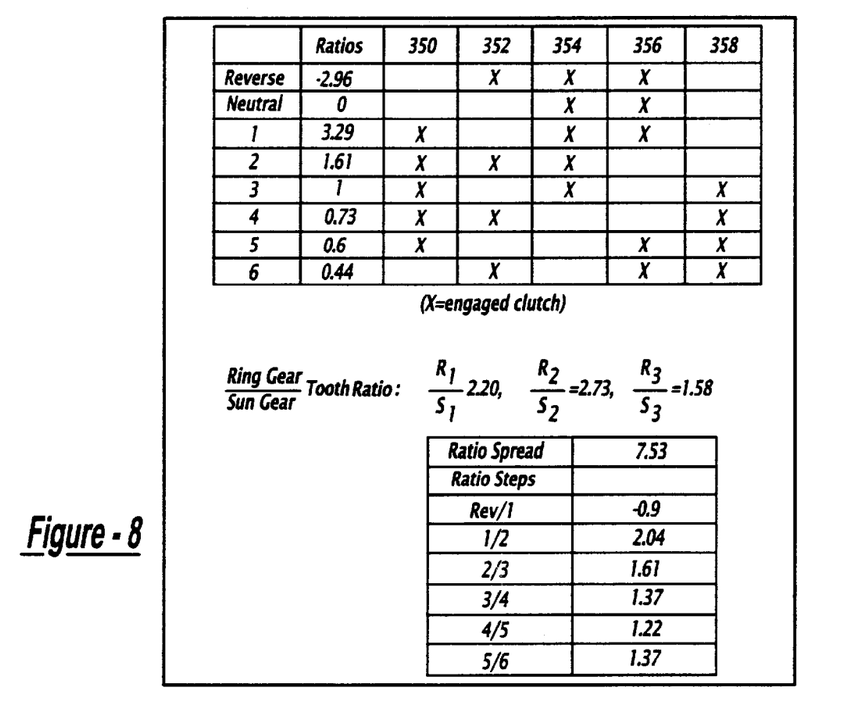
FIG. 8 is a truth table and chart describing some of the operating characteristics of the powertrain depicted in FIG. 7.

As is evident from the truth table of FIG. 8, the torque transmitting mechanisms 350, 352, 354, 356, and 358 are selectively engageable in combinations of three to provide six forward speed ratios and a reverse ratio in the planetary gear arrangement 318 between the input shaft 17 and the output shaft 19. Those skilled in the art will notice that all of the single step interchanges between the forward speed ratios are of the single transition type.

The reverse speed ratio is established by the engagement of the torque transmitting mechanisms 352, 354 and 356. The ring gear member 324 and the ring gear member 344 are driven forwardly at a speed determined by the speed of the sun gear member 322, the speed of the planet carrier assembly member 326 (rotating reaction), and the ring gear/sun gear tooth ratio of the planetary gear set 320. The planet carrier assembly member 346, the planet carrier assembly member 326, and the sun gear member 332 are driven forwardly at a speed determined by the speed of the ring gear member 344 and the ring gear/sun gear tooth ratio of the planetary gear set 340. The ring gear member 334 and the output shaft 19 are driven in reverse at a speed determined by the speed of the sun gear member 332 and the ring gear/sun gear tooth ratio of the planetary gear set 330. The numerical value of the reverse ratio is determined by the ring gear/sun gear tooth ratios of the planetary gear sets 320, 330 and 340.

A neutral condition can be attained with the engagement of the torque transmitting mechanisms 354 and 356. The first forward speed ratio is established with the engagement of the torque transmitting mechanisms 350, 354 and 356. Thus, a forward/reverse interchange can be accomplished with the swapping of the torque transmitting mechanisms 350 and 352. During the first forward speed ratio, the ring gear member 324 is held stationary by the torque transmitting mechanisms 350 and 356. The planet carrier assembly member 326 and the sun gear member 332 are driven in reverse at a speed determined by the speed of the sun gear member 322 and the ring gear/sun gear tooth ratio of the planetary gear set 320. The numerical value of the first forward speed ratio is determined by the ring gear/sun gear tooth ratios of the planetary gear sets 320 and 330.

The second forward speed ratio is established by the engagement of the torque transmitting mechanisms 350, 352 and 354. The planet carrier assembly member 346, the planet carrier assembly member 326 and the sun gear member 332 are held stationary through the cooperation of the torque transmitting mechanisms 350 and 352. The ring gear member 324 and the planet carrier assembly member 336 are driven forwardly at a speed determined by the speed of the sun gear member 322 and the tooth ratio of the planetary gear set 320. The ring gear member 334 and the output shaft 19 are driven forwardly at a reduced speed determined by the speed of the planet carrier assembly member 336 and the ring gear/sun gear tooth ratio of the planetary gear set 330. The numerical value of the second forward speed ratio is determined by the ring gear/sun gear tooth ratios of the planetary gear sets 320 and 330.

The third forward speed ratio is established with the engagement of the torque transmitting mechanisms 350, 354 and 358. The planetary gear sets 320 and 330 and the output shaft 10 are rotated in unison at a speed equal to the speed of the input shaft 17. The third forward speed ratio is a one to one ratio.

The fourth forward speed ratio is established by the engagement of the torque transmitting mechanisms 350, 352 and 358. The sun gear member 332, planet carrier assembly member 326, and the planet carrier assembly member 346 are held stationary by the cooperation of the torque transmitting mechanisms 350 and 352 and the planetary gear set 340. The planet carrier assembly member 336 is driven forwardly at a speed equal to the speed of the input shaft 17. The ring gear member 334 and the output shaft 19 are driven forwardly at an increased speed determined by the speed of the planet carrier assembly member 336 and the ring gear/ sun gear tooth ratio of the planetary gear set 330. The numerical value of the fourth forward speed ratio is determined by the ring gear/sun gear tooth ratio of the planetary gear set 330.

The fifth forward speed ratio is established with the engagement of the torque transmitting mechanisms 350, 356 and 358. The ring gear member 324 is held stationary through the cooperation of the torque transmitting mechanisms 350 and 356. The planet carrier assembly member 326 and the sun gear member 332 are driven in reverse at a speed determined by the speed of the sun gear member 322 and the ring gear/sun gear tooth ratio of the planetary gear set 320. The ring gear member 334 and the output shaft 19 are driven forwardly at an increased speed determined by the speed of the sun gear member 332, the speed of the planet carrier assembly member 336 (input speed), and the ring gear/sun gear tooth ratio of the planetary gear set 330. The numerical value of the fifth forward speed ratio is determined by the ring gear/sun gear tooth ratio of the planetary gear sets 320 and 330.

The sixth forward speed ratio is established by the engagement of the torque transmitting mechanisms 352, 356 and 358. The planet carrier assembly member 326, the sun gear member 332, and the planet carrier assembly member 346 are driven in reverse at a speed determined by the speed of the sun gear member 322, the speed of the ring gear member 326 (rotating reaction), and the ring gear/sun gear tooth ratio of the planetary gear set 320. The ring gear member 344 and the ring gear member 324 are driven in reverse at a speed determined by the speed of the planet carrier assembly member 346 and the ring gear/sun gear tooth ratio of the planetary gear set 340. The ring gear member 334 and the output shaft 19 are driven forwardly at an increased speed determined by the speed of the sun gear member 332, the speed of the planet carrier assembly member 336, and the ring gear/sun gear tooth ratio of the planetary gear set 330. The numerical value of the sixth forward speed ratio is determined by the ring gear/sun gear tooth ratio of the planetary gear sets 320, 330 and 340.

The tables in FIG. 8 describe the engagement schedule of the torque transmitting mechanisms 350, 352, 354, 356, and 358 during the establishment of the reverse speed ratio and the six forward speed ratios. FIG. 8 also provides an example of possible ring gear/sun gear tooth ratios for the planetary gear sets 320, 330 and 340 as well as speed ratio values that are attained with these ring gear/sun gear tooth ratios. FIG. 8 further provides the step ratios between adjacent speed ratios, the overall ratio spread of the forward speed ratios, and the reverse/first ratio step. As pointed out above, the single step interchanges are all of the single transition type.

Figure 9:
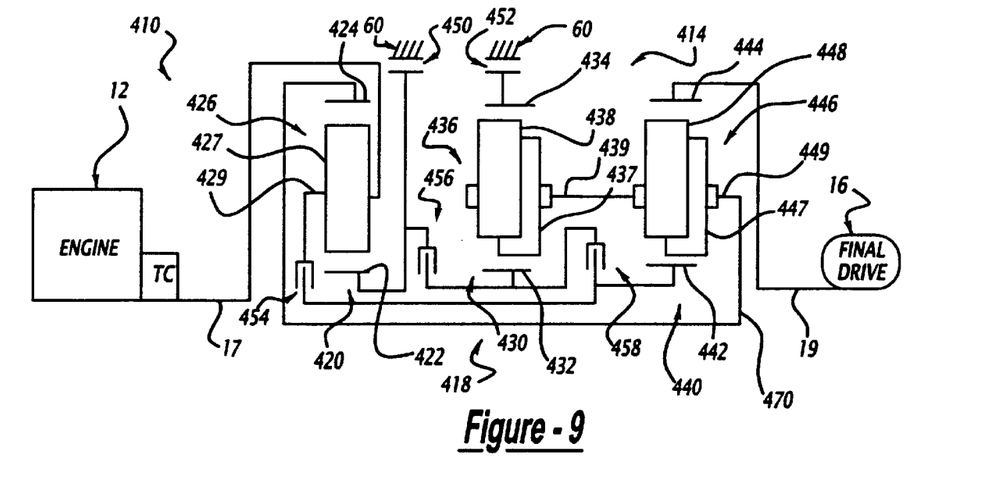
FIG. 9 is schematic representation of a powertrain incorporating another embodiment of the present invention.

A powertrain 410, shown in FIG. 9, includes the engine and starting device 12, a multi-speed transmission 414, and the final drive mechanism 16. The multi-speed transmission 414 is comprised of the input shaft 17, a planetary gear arrangement 418, and an output shaft 19. The input shaft 17 is continuously connected with the engine and starting device 12 and the output shaft 19 is continuously connected with the final drive mechanism 16.

The planetary gear arrangement incorporates three planetary gear sets 420, 430 and 440 and five torque transmitting mechanisms 450, 452, 454, 456, and 458. The planetary gear set 420 includes a sun gear member 422, a ring gear member 424, and a planet carrier assembly member 426 that has a plurality of pinion gear members 427 rotatably mounted on a carrier 429 and disposed in meshing engagement with both of the sun gear member 422 and the ring gear member 424. The planetary gear set 430 includes a sun gear member 432, a ring gear member 434, and a planet carrier assembly member 436 having a plurality of intermeshing pinion gear members 437 and 438 that are rotatably mounted on a carrier 439 and disposed in meshing relation with the sun gear member 432 and the ring gear member 434, respectively. The planetary gear set 440 includes a sun gear member 442, a ring gear member 444, and a planet carrier assembly member 446 that includes a plurality of intermeshing pinion gear members 447 and 448 that are rotatably mounted on a carrier 449 and disposed in meshing relation with the sun gear member 442 and the ring gear member 444, respectively.

The planet carrier assembly member 426 is continuously interconnected with the input shaft 17 and the ring gear member 444 is continuously interconnected with the output shaft 19. The ring gear member 424, the planet carrier assembly member 436 and the planet carrier assembly member 446 are continuously interconnected through the interconnecting member 470. The sun gear member 422 is selectively interconnectable with the housing 60 through the torque transmitting mechanism 450 and is selectively interconnectable with the sun gear member 432 through the torque transmitting mechanism 456. The planet carrier assembly member 426 and the input shaft 17 are selectively interconnectable with the sun gear member 442 through the torque transmitting mechanism 454. The sun gear member 432 is selectively interconnectable with the sun gear member 442 through the torque transmitting mechanism 458. The ring gear member 434 is selectively interconnectable with the housing 60 through the torque transmitting mechanism 452.

Figure 10:
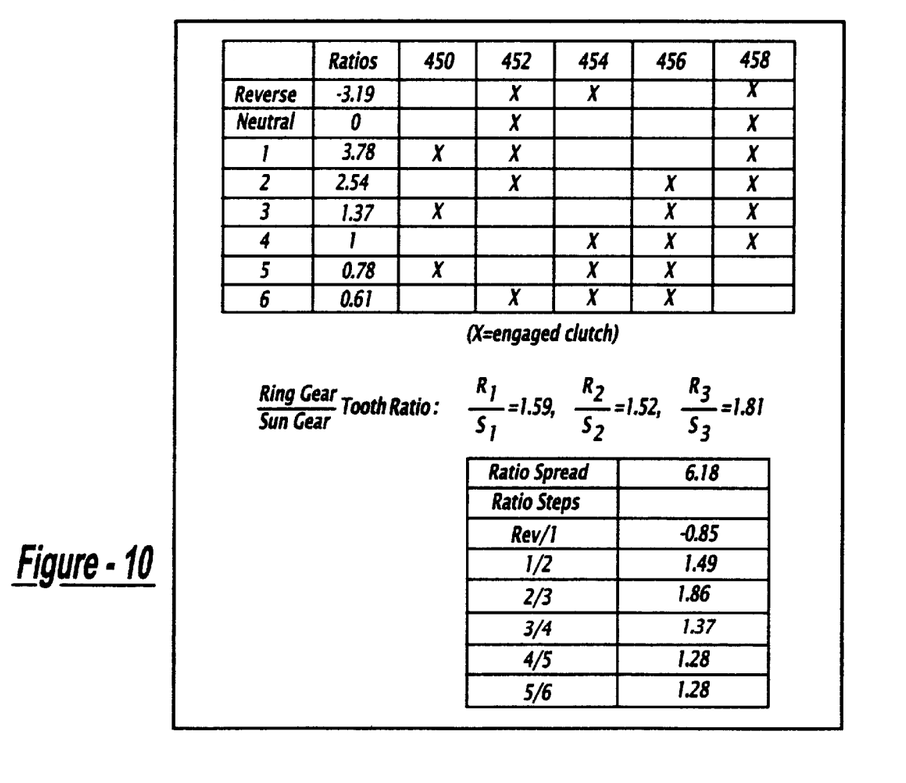
FIG. 10 is a truth table and chart describing some of the operating characteristics of the powertrain depicted in FIG. 9.

As seen in the truth table of the charts in FIG. 10, the torque transmitting mechanisms 450, 452, 454, 456, and 458 are selectively engaged in combinations of three to establish six forward speed ratios and a reverse ratio in the planetary gear arrangement 418 between the input shaft 17 and the output shaft 19. It should be noted that all of the forward single step ratio interchanges are of the single transition type. The reverse speed ratio is established by the engagement of the torque transmitting mechanisms 452, 454, and 458. The ring gear member 434 is held stationary and the sun gear members 432 and 442 are rotated in unison with the input shaft 17. The planet carrier assembly member 436 and the planet carrier assembly member 446 are driven in reverse at a speed determined by the speed of the sun gear member 432 and the ring gear/sun gear tooth ratio of the planetary gear set 430. The ring gear member 444 and the output shaft are driven in reverse at a reduced speed determined by the speed of the planet carrier assembly member 446, the speed of the sun gear member 442, and the ring gear/sun gear tooth ratio of the planetary gear set 440. The numerical value of the reverse speed ratio is determined by the ring gear/sun gear tooth ratio of the planetary gear sets 430 and 440.

The planetary gear arrangement is conditioned for neutral when the torque transmitting mechanisms 452 and 458 are engaged. This permits a single transition interchange between the reverse speed ratio and the first forward speed ratio with the swapping of only the torque transmitting mechanisms 454 and 450. During the first forward speed ratio, the sun gear member 422, and the ring gear member 434 are held stationary. The ring gear member 424, planet carrier assembly member 446, and the planet carrier assembly member 436 are driven forwardly at a speed determined by the speed of the planet carrier assembly member 426 and the ring gear/sun gear tooth ratio of the planetary gear set 420. The sun gear member 432 and the sun gear member 442 are driven in reverse at a speed determined by the speed of the planet carrier assembly member 436 and the ring gear/ sun gear tooth ratio of the planetary gear set 430. The ring gear member 444 and the output shaft 19 are driven forwardly at a reduced speed determined by the speed of the sun gear member 442, the speed of the planet carrier assembly member 446 and the ring gear/sun gear tooth ratio of the planetary gear set 440. The numerical value of the first forward speed ratio is determined by the ring gear/sun gear tooth ratios of the planetary gear sets 420, 430 and 440.

The second forward speed ratio is established by the engagement of the torque transmitting mechanisms 452, 456 and 458. The ring gear member 434 is held stationary and all of the sun gear members 422, 432 and 442 rotate in unison at a speed determined by the speed of the planet carrier assembly member 426, the speed of the ring gear member 424 (rotating reaction), and the ring gear/sun gear tooth ratio of the planetary gear set 420. The ring gear member 424, the planet carrier assembly member 436, and the planet carrier assembly member 446 are rotated at a speed determined by the speed of the sun gear member 432 and the ring gear/sun gear tooth ratio of the planetary gear set 430. The ring gear member 444 and the output shaft 19 are driven forwardly at a reduced speed determined by the speed of the sun gear member 442, the speed of the planet carrier assembly member 446 and the ring gear/sun gear tooth ratio of the planetary gear set 440. The numerical value of the planetary gear sets 420, 430 and 440.

The third forward speed ratio is established with the engagement of the torque transmitting mechanisms 450, 456 and 458. The sun gear members 422, 432 and 442 are held stationary through the cooperation of the torque transmitting mechanisms 450, 456 and 458. The ring gear member 424 and the planet carrier assembly member 446 are driven forwardly at a speed determined by the speed of the planet carrier assembly member 426 and the ring gear/sun gear tooth ratio of the planetary gear set 420. The ring gear member 444 and the output shaft 19 are driven forwardly at a reduced speed determined by the speed of the planet carrier assembly member 446 and the ring gear/sun gear tooth ratio of the planetary gear set 440. The numerical value of the third forward speed ratio is determined by the ring gear/sun gear tooth ratios of the planetary gear sets 420 and 440.

The fourth forward speed ratio is established by the engagement of the torque transmitting mechanisms 454, 456 and 458. The planetary gear sets 420, 430 and 440 and the output shaft 19 rotate forwardly in unison with the input shaft 17. The fourth forward speed ratio is a one-to-one ratio.

The fifth forward speed ratio is established with the engagement of the torque transmitting mechanisms 450, 454 and 456. The sun gear member 422 and the sun gear member 432 are held stationary. The ring gear member 424 and the planet carrier assembly member 446 are driven forwardly at a speed determined by the speed of the planet carrier assembly member 426 and the ring gear/sun gear tooth ratio of the planetary gear set 420. The ring gear member 444 and the output shaft 19 are driven forwardly at an increased speed determined by the speed of the planet carrier assembly member 446, the speed of the sun gear member 442, and the ring gear/sun gear tooth ratio of the planetary gear set 440. The numerical value of the fifth forward speed ratio is determined by the ring gear/sun gear tooth ratios of the planetary gear sets 420 and 440.

The sixth forward speed ratio is established with the engagement of the torque transmitting mechanisms 452, 454 and 456. The ring gear member 434 is held stationary. The ring gear member 424, the planet carrier assembly member 446, and the planet carrier assembly member 436 are driven forwardly at an increased speed determined by the speed of the planet carrier assembly member 426, the speed of the sun gear member (rotating reaction) and the ring gear/sun gear tooth ratio of the planetary gear set 420. The sun gear member 432 and the sun gear member 422 are driven at a speed determined by the speed of the planet carrier assembly member 436 and the ring gear/sun gear tooth ratio of the planetary gear set 430. The ring gear member 444 and the output shaft 19 are driven forwardly at a speed determined by the speed of the planet carrier assembly member 446, the speed of the sun gear member 442, and the ring gear/sun gear tooth ratio of the planetary gear set 440. The numerical value of the sixth forward speed ratio is determined by the planetary gear sets 420, 430 and 440.

The charts in FIG. 10, as mentioned above, describe the engagement schedule of the torque transmitting mechanisms 450, 452, 454, 456, and 458 during the establishment of the reverse speed ratio and the six forward speed ratios. FIG. 10 also provides an example of possible ring gear/sun gear tooth ratios for the planetary gear sets 420, 430 and 440 as well as speed ratio values that are attained with these ring gear/sun gear tooth ratios. FIG. 10 further provides the step ratios between adjacent speed ratios, the overall ratio spread of the forward speed ratios, and the reverse/first ratio step. As pointed out above, the single step interchanges are all of the single transition type.

Figure 11:
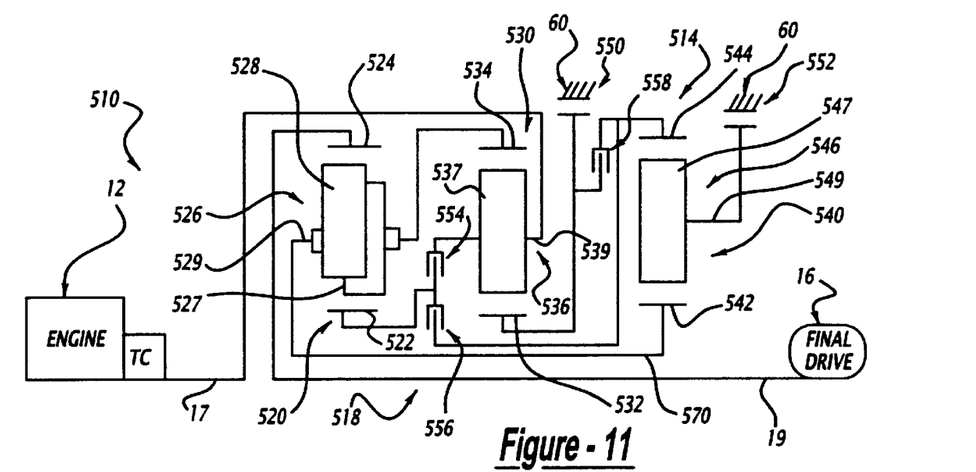
FIG. 11 is schematic representation of a powertrain incorporating another embodiment of the present invention.

A powertrain 510, shown in FIG. 11, includes the engine and starting device 12, a multi-speed transmission 514, and the final drive mechanism 16. The multi-speed transmission 514 is comprised of the input shaft 17, a planetary gear arrangement 518, and an output shaft 19. The input shaft 17 is continuously connected with the engine and starting device 12 and the output shaft 19 is continuously connected with the final drive mechanism 16.

The planetary gear arrangement incorporates three planetary gear sets 520, 530 and 540 and five torque transmitting mechanisms 550, 552, 554, 556, and 558. The planetary gear set 520 includes a sun gear member 522, a ring gear member 524, and a planet carrier assembly member 526 that has a plurality of intermeshing pinion gear members 527 and 528 rotatably mounted on a carrier 529 and disposed in meshing engagement with the sun gear member 522 and the ring gear member 524, respectively. The planetary gear set 530 includes a sun gear member 532, a ring gear member 534, and a planet carrier assembly member 536 having a plurality of pinion gear members 537 that are rotatably mounted on a carrier 539 and disposed in meshing relation with both of the sun gear member 532 and the ring gear member 534. The planetary gear set 540 includes a sun gear member 542, a ring gear member 544, and a planet carrier assembly member 546 that includes a plurality of pinion gear members 547 that are rotatably mounted on a carrier 549 and disposed in meshing relation with both of the sun gear member 542 and the ring gear member 544.

The planet carrier assembly member 536 is continuously interconnected with the input shaft 17, and the ring gear member 524 is continuously interconnected with the output shaft 10. The planet carrier assembly member 526, the ring gear member 534, and the sun gear member 542 are continuously interconnected through an interconnecting member 570. The sun gear member 532 is selectively interconnectable with the housing 60 through the torque transmitting mechanism 550. The planet carrier assembly member 546 is selectively interconnectable with the housing 60 through the torque transmitting mechanism 552. The sun gear member 522 is selectively interconnectable with the planet carrier assembly member 536 and the input shaft 17 through the torque transmitting mechanism 554, and is selectively interconnectable with the ring gear member 544 through the torque transmitting mechanism 556. The sun gear member 532 is selectively interconnectable with the ring gear member 544 through the torque transmitting mechanism 558.

The torque transmitting mechanisms 550, 552, 554, 556, and 558 are selectively engaged in combinations of three to establish six forward speed ratios and a reverse speed ratio through the planetary gear arrangement 518 between the input shaft 17 and the output shaft 19. The reverse speed ratio is established with the engagement of the torque transmitting mechanisms 552, 554 and 556. The planet carrier assembly member 546 is held stationary and the sun gear member 522 and the ring gear member 544 rotate in unison with the input shaft 17. The sun gear member 542 and the planet carrier assembly member 526 are driven in reverse at a speed determined by the speed of the ring gear member 544 and the ring gear/sun gear tooth ratio of the planetary gear set 540. The ring gear member 524 and the output shaft 19 are driven in reverse at a speed determined by the speed of the sun gear member 522, the speed of the planet carrier assembly member 526 and the ring gear/sun gear tooth ratio of the planetary gear set 520. The numerical value of the reverse speed ratio is determined by the ring gear/sun gear tooth ratios of the planetary gear sets 540 and 520.

A neutral condition can be attained with the engagement of the torque transmitting mechanisms 552 and 556. This permits a single transition interchange between the reverse speed ratio and the first forward speed ratio with the swapping of the torque transmitting mechanisms 554 and 550. During the first forward speed ratio, the planet carrier assembly member 546 and the sun gear member 532 are held stationary. The sun gear member 522 and the ring gear member 544 are interconnected and, therefore, rotate in unison. The ring gear member 534, the planet carrier assembly member 526, and the sun gear member 542 are driven at a speed determined by the speed of the planet carrier assembly member 536 and the ring gear/sun gear tooth ratio of the planetary gear set 530. The ring gear member 544 and the sun gear member 522 are driven at a speed determined by the speed of the sun gear member 542 and the ring gear/sun gear tooth ratio of the planetary gear set 540. The ring gear member 524 and the output shaft 19 are driven forwardly at a reduce ratio determined by the speed of the planet carrier assembly member 526, the speed of the sun gear member 522 and the ring gear/sun gear tooth ratio of the planetary gear set 520. The first forward speed ratio is determined by the ring gear/sun gear tooth ratios of the planetary gear sets 520, 530 and 540.

The second forward speed ratio is established with the engagement of the torque transmitting mechanisms 552, 556 and 558. The ring gear member 534, the planet carrier assembly member 526 and the sun gear member 542 are driven at a speed determined by the speed of the planet carrier assembly member 536, the speed of the sun gear member 532 (rotating reaction), and the ring gear/sun gear tooth ratio of the planetary gear set 530. The ring gear member 544, the sun gear member 532, and the sun gear member 522 are driven at a speed determined by the speed of the sun gear member 542 and the ring gear/sun gear tooth ratio of the planetary gear set 540. The ring gear member 524 and the output shaft 19 are driven forwardly at a reduced speed determined by the speed of the planet carrier assembly member 526, the speed of the sun gear member 522 and the ring gear/sun gear tooth ratio of the planetary gear set 520. The numerical value of the second forward speed ratio is determined by the ring gear/sun gear tooth ratios of the planetary gear sets 520, 530 and 540.

The third forward speed ratio is established by the engagement of the torque transmitting mechanisms 550, 556 and 558. The ring gear member 544, the sun gear member 532 and the sun gear member 522 are held stationary. The ring gear member 534 and the planet carrier assembly member 526 are rotated at a speed determined by the speed of the planet carrier assembly member 536 and the ring gear/sun gear tooth ratio of the planetary gear set 530. The ring gear member 524 and the output shaft 19 are driven forwardly at a reduced speed determined by the speed of the planet carrier assembly member 526 and the ring gear/sun gear tooth ratio of the planetary gear set 520. The numerical value of the third forward speed ratio is determined by the ring gear/sun gear tooth ratios of the planetary gear sets 520 and 530.

The fourth forward speed ratio is established by the engagement of the torque transmitting mechanisms 554, 556 and 558, which will cause the input shaft 17, the planetary gear sets 520, 530 and 540, and the output shaft 19 to rotate in unison. The fourth forward speed ratio is therefore one-to-one.

The fifth forward speed ratio is established with the engagement of the torque transmitting mechanisms 550, 554 and 558. The sun gear member 532 and the ring gear member 544 are held stationary. The sun gear member 522 is driven by the input shaft 17. The ring gear member 534 and the planet carrier assembly member 526 are driven forwardly at a speed determined by the speed of the planet carrier assembly member 536 and the ring gear/sun gear tooth ratio of the planetary gear set 530. The ring gear member 524 and the output shaft 19 are driven forwardly at an increased speed determined by the speed of the planet carrier assembly member 526, the speed of the sun gear member 522 and the ring gear/sun gear tooth ratio of the planetary gear set 520. The numerical value of the fifth forward speed ratio is determined by the ring gear/sun gear tooth ratios of the planetary gear sets 520 and 530.

The sixth forward speed ratio is established with the engagement of the torque transmitting mechanisms 552, 554 and 558. The planet carrier assembly member 546 is held stationary, the sun gear member 522 is driven in unison with the input shaft 17, and the ring gear member 544 and the sun gear member 532 rotate in unison. The ring gear member 534, the planet carrier assembly member 526 and the sun gear member 542 are driven forwardly at a speed determined by the speed of the planet carrier assembly member 536, the speed of the sun gear member 532 and the ring gear member 544 (rotating reaction), and the ring gear/sun gear tooth ratio of the planetary gear set 530. The ring gear member 544 is driven at a speed determined by the speed of the sun gear member 542 and the ring gear/sun gear tooth ratio of the planetary gear set 540. The ring gear member 524 and the output shaft 19 are driven forwardly at an increased speed determined by the speed of the sun gear member 522, the speed of the planet carrier assembly member 526, and the ring gear/sun gear tooth ratio of the planetary gear set 520. The numerical value of the sixth forward speed ratio is determined by the ring gear/sun gear tooth ratios of the planetary gear sets 520, 530 and 540.

Figure 12:
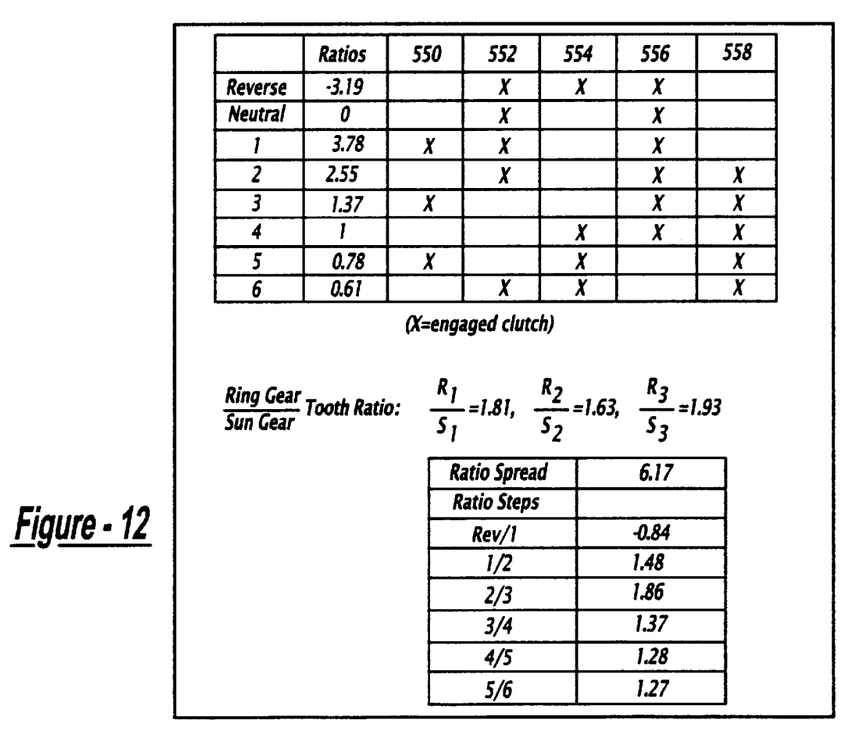
FIG. 12 is a truth table and chart describing some of the operating characteristics of the powertrain depicted in FIG. 11.

The tables and charts in FIG. 12 describe the engagement schedule of the torque transmitting mechanisms 550, 552, 554, 556, and 558 during the establishment of the reverse speed ratio and the six forward speed ratios. FIG. 12 also provides an example of possible ring gear/sun gear tooth ratios for the planetary gear sets 520, 530 and 540 as well as speed ratio values that are attained with these ring gear/sun gear tooth ratios. FIG. 10 further provides the step ratios between adjacent speed ratios, the overall ratio spread of the forward speed ratios, and the reverse/first ratio step. Those skilled in the art will recognize that the forward ratio single step interchanges are all of the single transition type.

The transmission family members, including those described above, include three planetary gear sets that each include three members. Each of the members can be a sun gear member, a ring gear member, or a planet carrier assembly member. A first member of the first planetary gear set is continuously interconnected with the transmission input shaft, a first member of the third planetary gear set is continuously interconnected with the transmission output shaft, and a first member of the second planetary gear set is continuously interconnected with a second member of both of the first and third planetary gear sets. Each member incorporates five torque transmitting mechanisms (two friction brakes and three friction clutches) that are selectively engaged in combinations of three to establish six forward speed ratios and one reverse speed ratio. A first of the torque transmitting mechanisms is selectively interconnectable between a transmission housing and either a third member of the first planetary gear set or a second or third member of the second planetary gear set. A second of the torque transmitting mechanisms is selectively interconnectable between the transmission housing and either a second member of the second planetary gear set or third member of the third planetary gear set. A third of the torque transmitting mechanisms is selectively interconnectable between the first member of the first planetary gear set and either the second or third member of second planetary gear set or the third member of the third planetary gear set. A fourth of the torque transmitting mechanisms is selectively interconnectable between the third member of the second planetary gear set and either the third member of the first planetary gear set or the third member of the third planetary gear set. A fifth of the torque transmitting mechanisms is selectively interconnectable between the third member of the first planetary gear sets and either the first member or the third member of the third planetary gear set or the second member or third member of the second planetary gear set. It should be noted that the first and third planetary gear sets each have two members and the second planetary gear set has one member that are continuously interconnected with other components of the planetary gear sets. The first and third planetary gear sets have one member that is non-continuously but selectively interconnectable with other components of the transmission through the judicious selective engagement of the torque transmitting mechanisms. The second planetary gear set has two members that are non-continuously but selectively interconnectable with other components of the transmission through the judicious selective engagement of the torque transmitting mechanisms.

What is claimed is:

1. A multi-speed transmission comprising:

input shaft;

output shaft;

an interconnecting member;

first, second, and third planetary gear sets each having first, second, and third member comprised of either a sun gear member, a ring gear member or a planet carrier assembly member, a first member of the first planetary gear set being continuously interconnected with said input shaft, a first member of said third planetary gear set being continuously interconnected with said output shaft, a first member of said second planetary gear set and a second member of said first planetary gear set and a second member of said third planetary gear set being continuously interconnected with said interconnecting member;

a stationary member;

five torque transmitting mechanisms comprising two selectively engageable brakes and three selectively engageable clutches that provide selective interconnection between members of said multi-speed transmission, including:

said first brake selectively interconnecting said stationary member with said third member of said first planetary gear set, said second brake selectively interconnecting said stationary member with said third member of said third planetary gear set, said first clutch selectively interconnecting said first member of said first planetary gear set with said second member of said second planetary gear set, said second clutch selectively interconnecting said third member of said first planetary gear set with said second member of said second planetary gear set, and said third clutch selectively interconnecting said third member of said third planetary gear set with said third member of said second planetary gear set, or said first brake selectively interconnecting said stationary member with said second member of said second planetary gear set, said second brake selectively interconnecting said stationary member with said third member of said third planetary gear set, said first clutch selectively interconnecting said first member of said first planetary gear set with said third member of said second planetary gear set, said second clutch selectively interconnecting said third member of said first planetary gear set with said third member of said second planetary gear set, said third clutch selectively interconnecting said first member of said third planetary gear set with said third member of said first planetary gear set, or said first brake selectively interconnecting said stationary member with said second member of said second planetary gear set, said second brake selectively interconnecting said stationary member with said third member of said second planetary gear set, said first clutch selectively interconnecting said third member of said first planet gear set with said second member of said third planetary gear set, said second clutch selectively interconnecting said third member of said first planetary gear set with said third member if said third planetary gear set, and said third clutch selectively interconnecting said first member of said first planetary gear set with said third member of said third planetary gear set, or said first brake selectively interconnecting said stationary member with said second member of said second planetary gear set, said second brake selectively interconnecting said stationary member with said third member of said second planetary gear set, said first clutch selectively interconnecting said third member of said first planetary gear set with said third member of said third planetary gear set, sad second clutch selectively interconnecting said third member of said first planetary gear set with said second member of said second planetary gear set, and said third clutch selectively interconnecting said first member of said first planetary gear set with said third member of said third planetary gear set, or said first brake selectively interconnecting said stationary member with said third member of said first planetary gear set, said second brake selectively interconnecting said stationary member with said third member of said second planetary gear set, said first clutch selectively interconnecting said first member of said first planetary gear set with said third member of said third planetary gear set, said second clutch selectively interconnecting said third member of said first planetary gear set with said second member of said second planetary gear set, said third clutch selectively interconnecting said third member of said second planetary gear set with said third member of said third planetary gear set, or said first brake selectively interconnecting said stationary member with said third member of said first planetary gear set, said second brake selectively interconnecting said stationary member with said third member of said second planetary gear set, said first clutch selectively interconnecting said first member of said first planetary gear set with said third member of said third planetary gear set, said second clutch selectively interconnecting said third member of said first planetary gear set wit said third member of said third planetary gear set, and said third clutch selectively interconnecting said second member of said second planetary gear set with said third member of said second planetary gear set; and said clutches and brakes being engaged in seven combinations of three to establish six forward speed ratios and one reverse speed ratio between said input shaft and said output shaft.

2. The multi-speed transmission defined in claim 1 further wherein:

said three members of each of said planetary gear sets are one of a sun gear member, a ring gear member, and a planet carrier assembly member; and said first member of said first planetary gear set being one of a sun gear member and a planet carrier assembly member, said first member of said third planetary gear set being one of a ring gear member and a planet carrier assembly member, and said first member of said second planetary gear set being one of a sun gear member and a planet carrier assembly member.

3. The multi-speed transmission defined in claim 1 further wherein:

said second member of said first planetary gear set is one of a ring gear member and a planet carrier assembly member;

said second member of said third planetary gear set being one of a sun gear member and a planet carrier assembly member; and said first member of said second planetary gear set being one of a sun gear member and a planet carrier assembly member.

4. A multi-speed transmission comprising:

an input shaft, an output shaft;

transmission housing;

an interconnecting member; first, second, and third planetary gear sets each having first, second, and third members comprised of either a sun gear member, a ring gear member or a planet carrier assembly member, wherein said first members are continuously interconnected with said interconnecting member, said input shaft being continuously interconnected with at least one member of said planetary gearsets, and said output shaft being continuously interconnected with another member of said planetary gearsets;

five selectively engageable torque transmitting mechanisms connecting members of said planetary gearsets with other members of said planetary gearsets or with said transmission housing;

said five torque transmitting mechanisms being selectively engageable in combinations of three to establish at least six forward speed ratios and one reverse speed ratio between said input shaft and said output shaft.

* * * * *